US011418462B2

(12) United States Patent
Hubauer et al.

(10) Patent No.: US 11,418,462 B2
(45) Date of Patent: Aug. 16, 2022

(54) BOT FOR A COMMUNICATION PLATFORM

(71) Applicant: SIEMENS AKTIENGESELLSCHAFT, Munich (DE)

(72) Inventors: Thomas Hubauer, Garching bei München (DE); Christer Karlsson, Linköping (SE)

(73) Assignee: SIEMENS AKTIENGESELLSCHAFT, Munich (DE)

(*) Notice: Subject to any disclaimer, the term of this patent is extended or adjusted under 35 U.S.C. 154(b) by 0 days.

(21) Appl. No.: 16/214,538

(22) Filed: Dec. 10, 2018

(65) Prior Publication Data
US 2019/0182183 A1    Jun. 13, 2019

(30) Foreign Application Priority Data
Dec. 12, 2017    (EP) .................................... 17206615

(51) Int. Cl.
*H04L 12/58*  (2006.01)
*H04L 29/08*  (2006.01)
(Continued)

(52) U.S. Cl.
CPC .............. *H04L 51/02* (2013.01); *G06F 40/30* (2020.01); *G06Q 10/20* (2013.01); *H04L 51/16* (2013.01); *H04L 67/16* (2013.01); *G06Q 10/107* (2013.01)

(58) Field of Classification Search
CPC ......... H04L 51/32; H04L 67/16; H04L 67/28; G06F 17/30675; G06F 17/30684;
(Continued)

(56) References Cited

U.S. PATENT DOCUMENTS 8,452,772 B1    5/2013   Carpio et al.
2012/0117076 A1* 5/2012  Austermann ....... G06F 16/2228
                                                707/E17.049
(Continued)

FOREIGN PATENT DOCUMENTS

EP            3223095 A1    9/2017

OTHER PUBLICATIONS

Non-english European Search Report dated Jun. 12, 2020 for Application No. 17 206 615.1.

*Primary Examiner* — Kamal B Divecha
*Assistant Examiner* — Eui H Kim
(74) *Attorney, Agent, or Firm* — Schmeiser, Olsen & Watts LLP

(57) ABSTRACT

Provided is a bot for a communication platform, wherein the bot is set up to read in an input data record, wherein the input data record includes a plurality of tickets or a plurality of numerical representations of tickets, listen in on at least one communication process between at least two persons on the communication platform, wherein the at least one communication process has at least one service case or at least one numerical representation of a service case, and generate an output data record, wherein the output data record has the input data record and the at least one communication process. A corresponding communication platform, a computer-implemented method, and a computer program product are also provided.

6 Claims, 1 Drawing Sheet

Figure 1:
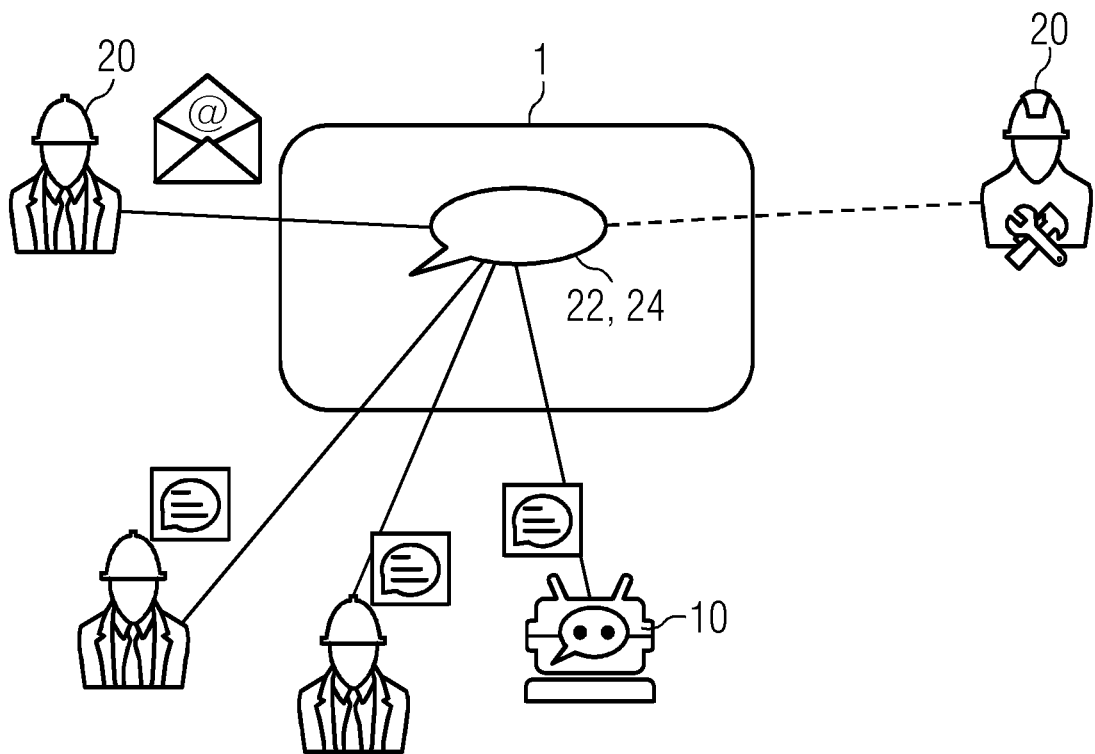

(51) Int. Cl.
*G06Q 10/00* (2012.01)
*G06F 40/30* (2020.01)
*G06Q 10/10* (2012.01)
*H04L 51/02* (2022.01)
*H04L 67/51* (2022.01)
*H04L 51/00* (2022.01)

(58) Field of Classification Search
CPC .. G06F 17/28; G06F 3/0482; G06F 17/30713; G06F 17/3069; G06F 17/2785; G06F 17/30654
See application file for complete search history.

(56) References Cited

U.S. PATENT DOCUMENTS

| | | | |
|---|---|---|---|
| 2014/0006438 A1* | 1/2014 | Singh | G06F 16/95 707/769 |
| 2016/0094507 A1* | 3/2016 | Li | H04L 67/16 709/206 |
| 2016/0357855 A1* | 12/2016 | Fan | G06N 3/084 |
| 2017/0324868 A1 | 11/2017 | Tamblyn et al. | |
| 2017/0330195 A1* | 11/2017 | Lange | G06F 3/04817 |
| 2018/0131645 A1* | 5/2018 | Magliozzi | H04L 51/02 |
| 2018/0167201 A1* | 6/2018 | Naqvi | H04L 63/0861 |
| 2019/0204820 A1 | 7/2019 | Andrassy et al. | |

* cited by examiner

BOT FOR A COMMUNICATION PLATFORM

CROSS-REFERENCE TO RELATED APPLICATION

This application claims priority to European Application No. 17206615.1, having a filing date of Dec. 12, 2017, the entire contents of which are hereby incorporated by reference.

FIELD OF TECHNOLOGY

The following relates to a bot for a communication platform, and a corresponding communication platform, a computer-implemented method, and a computer program product.

BACKGROUND

Various communication platforms are already known. The communication platforms ensure that data or information is/are interchanged between persons, in particular experts. The communication platforms can be set up as application software (also called application) on communication terminals such as a notebook or a smartphone. For example, "Circuit" is known as a communication platform. Circuit enables efficient communication via speech, messaging, video and screen sharing and file sharing.

The disadvantages of the communication platforms mentioned above are, inter alia, due to the fact that the data are mostly interchanged between experts. In particular, experts observe a particular abnormal behavior of an installation or of a unit of the installation and interchange messages relating to this via the communication platform.

Based on the above example, experts for turbines in the technical field of gas and wind power are confronted with a failure of a turbine. They together look for a solution, such as a particular measure, for overcoming the problem.

However, if the experts do not arrive at a clear diagnostic result or do not arrive at a diagnostic result, the diagnosis has failed. If the experts decisive for the diagnostic result are not available or are no longer available, the diagnosis may likewise fail.

The present invention is therefore based on the objective technical object of providing a communication platform which ensures efficient and reliable communication between persons and therefore improves the diagnostic result.

SUMMARY

An aspect relates to a bot for a communication platform, wherein the bot is set up to
a. read in an input data record, wherein
   the input data record comprises a plurality of tickets or a plurality of numerical representations of tickets,
b. listen in on at least one communication process between at least two persons on the communication platform, wherein
   the at least one communication process has at least one service case or at least one numerical representation of a service case, and
c. generate an output data record, wherein
   the output data record has the input data record and the at least one communication process.

Accordingly, embodiments of the invention are directed to a bot on a communication platform. The bot can also be referred to as a "chat bot" or "virtual assistant". The bot is a robot unit, software or other computer program for communication tasks.

Circuit, inter alia, should be mentioned as an exemplary communication platform, as stated further above. In addition to Circuit, Live Meeting, Messenger, Salesforce, Slack, WhatsApp, Signal and Telegram can also be cited. The communication platforms make it possible to interchange data between persons, in particular experts, as already described further above. The data can be interchanged, for example, by telephone, email, text messages or entries in a dialog system etc.

The bot first of all reads in an input data record, for example via an input interface. The input data record may have a plurality of tickets. The respective tickets are generated by humans, in particular persons. They may each have a description of the problem and a solution to the problem. Accordingly, the tickets are "human generated content".

In an exemplary situation, a person is an expert for a particular component, namely a turbine such as a gas turbine. The gas turbine can be coupled to a generator for producing electrical power. The expert creates a ticket for the turbine. The corresponding description of the problem in the ticket is directed to the components of the turbine and their symptoms as observable behavior. The corresponding solution to the problem in the ticket is directed to a suspected diagnosis such as imbalance of a shaft of the turbine and/or the elimination of the imbalance. In other words, the description of the problem and its solution are recorded by the expert in a ticket. In this case, an expert can create one or more tickets.

The bot can convert the plurality of tickets into a plurality of numerical representations of the tickets. The text can be converted into vectors by means of "Natural Language Processing (NLP)" and machine learning, in particular one ticket into one vector in each case. NLP is usually understood as meaning the machine processing of a natural language.

Alternatively, the bot can also read in a plurality of numerical representations of tickets. In this case, the conversion is dispensed with. For example, the "Salesforce" ticket system can provide the plurality of numerical representations of tickets for customer support in this respect. The text has already been converted into vectors by Salesforce.

The bot then listens in on one or more communication processes between two or more persons on the communication platform. The listening-in process comprises, in particular, identifying individual communication actions, in particular the translation of speech into text, and interpreting the textual communication contents. The bot listens in when the communication process takes place. In other words, the bot can track a communication process live ("LiveChat") such as an active conference.

In an exemplary situation, the bot listens in on a dialog between persons in a group in a particular active conference in Circuit. The communication process is associated with a service case or a plurality of service cases. The service case may be a diagnosis, another situation or another matter. For example, a service case may be directed to a shaft or other components and faults of the turbine.

The bot can in turn read in and convert the service case or can directly read in the numerical representation of said service case, in a manner comparable to the tickets.

The bot then expands the input data record with this communication process which has been listened in on. In other words, the knowledge base from logged tickets in the past is supplemented with the content of the communication processes currently being listened in on.

The advantage of the bot according to embodiments of the invention is its support for the persons on a communication platform. The bot primarily provides solutions to existing problems in an installation or a component of the installation in an efficient and user-friendly manner. Consequently, the problems can be solved more quickly than in the existing art and the persons can react considerably more quickly on the basis of the solution. The response time is accordingly considerably shortened. As a result, downtimes caused by defective installations or components can be reduced or entirely avoided. The installations or components can be subjected to an emergency shutdown as a solution or measure in the event of a fault thanks to the bot, for example, or can be operated at low load until servicing.

Another advantage can be seen in the fact that the knowledge of the experts can be centrally managed by the bot in the form of the tickets and, as a result, is not lost.

In one configuration, the bot is set up to convert the plurality of tickets into a plurality of numerical representations of the tickets by means of a linguistic algorithm.

In another configuration, the bot is set up to convert the at least one service case into at least one numerical representation of the service case by means of a linguistic algorithm. Accordingly, a ticket or a service case can be converted into its respective numerical representation by means of a linguistic algorithm. For example, the service case may be in the form of an email or another text message and can be converted into its numerical representation, in particular a numerical vector with a particular dimension, by means of NLP. As a result, the numerical representation can be advantageously automatically processed further by the bot in an efficient manner.

In another configuration, the bot is also set up to store the output data record in a storage unit, in particular a database. Accordingly, the output data record can be stored in a storage unit which can be accessed in an efficient and reliable manner. The database as a storage unit has proved to be particularly advantageous with respect to an efficient and simple query and management of the output data record.

In another configuration, the bot is also set up to listen in on a further communication process between at least two persons on the communication platform, wherein the further communication process has at least one service case or at least one numerical representation of a service case, and look for at least one similar service case in the storage unit on the basis of the at least one service case or the at least one numerical representation of the service case. Accordingly, the bot can listen in on a further or current communication process live ("LiveChat"), such as an active conference. The bot can use this further communication process to look for one or more stored service cases in the storage unit which are similar to the service case of the further or current communication process. In other words, the bot takes part in the communication process and can join in by identifying the problem and offering a solution to the persons involved in the communication process. The bot behaves proactively in this case. Consequently, in other words, the bot can advantageously support the persons in their communication process by looking for and offering problem solutions of similar cases which have already been stored.

In another configuration, the bot is also set up to look for at least one similar service case in the storage unit on the request of at least one person of the at least two persons. Accordingly, the bot can alternatively look for one or more stored service cases in the storage unit which are similar to the service case of the further or current communication process on the request of one or more persons. In other words, the database search is initiated by persons. The bot is reactive in this alternative case. As a result, the bot can advantageously support the persons by offering problem solutions of similar cases which have already been stored, depending on wishes or needs.

In another configuration, the similarity of the at least one similar service case is determined by means of a cosine similarity and a cosine similarity value is allocated to said service case on the basis of the cosine similarity. Accordingly, the service case of the further communication process is compared with the stored service cases in the database. In particular, their numerical representations are compared with one another on the basis of the cosine similarity or other similarity measures. In other words, a similarity calculation between vectors of identical dimensions is carried out. On the basis of this, the similar service cases can be advantageously assessed.

In another configuration, the bot is also set up to generate at least one similar service case by applying a linguistic algorithm to the further communication process if the similarity value undershoots a particular threshold value. Accordingly, the bot can also itself generate service cases. A linguistic algorithm can likewise be used for this purpose. The threshold value is undershot, in particular, if a problem is not identified or is partially identified. With respect to the above similarity calculation, this corresponds to no match or a partial match and therefore low or insufficient similarity values. The advantage can be seen in the fact that an alternative solution in the form of partial results is nevertheless made available to the persons instead of no solution. For example, the identification of the problem provides only the component, such as the turbine. This partial solution in the form of the partial identification by the bot can be useful for the persons by virtue of the latter searching further for disturbances and faults in this component.

In another configuration, the bot is also set up to generate at least one ticket from the at least one service case.

The embodiments also relate to a communication platform having the above bot.

The embodiments also relate to a computer-implemented method for a communication platform:

a. reading in an input data record by means of a bot, wherein the input data record comprises a plurality of tickets or a plurality of numerical representations of tickets, b. listening in on at least one communication process between at least two persons on the communication platform by means of the bot, wherein the at least one communication process has at least one service case or at least one numerical representation of a service case, and c. generating an output data record by means of the bot, wherein the output data record has the input data record and the at least one communication process.

The embodiments also relates to a computer program product having a computer program which has means for carrying out the method described above when the computer program is executed on a program-controlled device. The computer program product comprising a computer readable hardware storage device having computer readable program code stored therein, said program code executable by a processor of a computer system to implement a method.

A computer program product, for example a computer program means, may be provided or delivered, for example, as a storage medium, for example a memory card, a USB stick, a CD-ROM, a DVD, or else in the form of a downloadable file from a server in a network. This can be carried out, for example in a wireless communication network, by transmitting a corresponding file containing the computer program product or the computer program means. A control device, for example an industrial control PC or a programmable logic controller, PLC for short, or a microprocessor for a smartcard or the like is possible as the program-controlled device, in particular.

BRIEF DESCRIPTION

Figure 2:
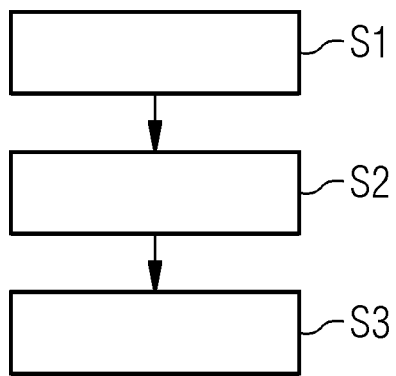

Some of the embodiments will be described in detail, with references to the following Figures, wherein like designations denote like members, wherein:

FIG. 1 shows a schematic illustration of a bot on a communication platform, in accordance with embodiments of the present invention; and FIG. 2 shows a flowchart of a method, in accordance with embodiments of the present invention.

DETAILED DESCRIPTION

Preferred embodiments of the present invention are described below with reference to the figures.

FIG. 1 schematically illustrates a bot 10 according to embodiments of the invention on a communication platform 1. The communication platform 1 can be in the form of any desired communication platform, such as a modern communication platform 1. The communication platform 1 ensures that information is efficiently interchanged between two or more persons 20, such as employees or experts. For example, experts 20 interchange information with respect to a turbine, as stated further above. In this case, the information is interchanged in the form of messages, for example via email, telephone or other types of communication.

The bot 10 listens in on a communication process 22 or a plurality of communication processes 24 between persons 20. For example, the bot 10 joins in an active conference of a group of experts 20 and listens in on their conference. The corresponding communication process 22 of the conference is directed to one or more service cases, for example a particular failure or a fault of the turbine. The respective service case may be present in different formats, such as text or in a numerical representation.

The bot 10 also combines the communication process 22 which has been listened in on with an input data record. Consequently, an input data record which has been read in and comprises past or already present service cases is supplemented with current service cases from the conference and is accordingly stored in an output data record.

The output data record can be stored in a storage unit, in particular a database. As an alternative to databases, any other storage units whose contents can be accessed come into consideration.

FIG. 2 shows the method according to embodiments of the invention with the three method steps in a flowchart. The method steps of reading in S1, listening in on S2 and generating S3 are carried out by the bot 10, as described in detail further above.

Although the present invention has been disclosed in the form of preferred embodiments and variations thereon, it will be understood that numerous additional modifications and variations could be made thereto without departing from the scope of the invention.

For the sake of clarity, it is to be understood that the use of 'a' or 'an' throughout this application does not exclude a plurality, and 'comprising' does not exclude other steps or elements.

The invention claimed is:

1. A bot for a communication platform, wherein the bot is stored in a memory of the communication platform, and when executed by a processor of the communication platform causes the bot to perform the steps of:
joins an active conference between at least two persons on the communication platform regarding at least one service case, the active conference being initiated by at least one person of the at least two persons on the communication platform to identify a problem with at least one of an installation and a component associated with the at least one service case, wherein the active conference is a live chat session between at least two persons;
converts the at least one service case into a numerical representation of the at least one service case using natural language processing and machine learning;
reads in an input data record comprising a plurality of tickets of past or already present service cases, wherein the bot has converted the plurality of tickets into a plurality of numerical representations of the tickets using natural language processing and machine learning;
listens in on the live chat session between at least two persons on the communication platform, wherein information is exchanged between the at least two persons during the live chat session and is associated with the at least one service case;
wherein the bot listens in on a further communication process between the at least two persons on the communication platform, wherein the further communication process has the at least one service case;
proactively identifies the problem and offers a solution to the problem to the at least two persons during the live chat session without being prompted by the at least two persons, wherein, as a function of proactively identifying the problem and offering the solution, the bot:
accesses a database to locate a similar case that is similar to the at least one service case, a similarity value being determined by performing a similarity calculation using a similarity function that compares the numerical representation of the at least one service case with the plurality of numerical representation stored in the database, wherein the bot generates the similar case by applying a linguistic algorithm to the further communication process if the similarity value undershoots a particular threshold value;
identifies the problem associated with the at least one service and offers the solution to the problem to the at least two persons during the live chat session on the communication platform based on a problem and solution of the similar case so that a response time to the at least one service case is shortened and a downtime experienced by the at least one of an installation and the component is at least reduced;
combines the input data record with a content of the live chat session which has been listened in on during the active conference between the at least two persons; and
generates an output data record which is stored in the database, wherein the output data record has the input data record and the content of the live chat session.

2. The bot as claimed in claim 1, wherein the similarity calculation includes determining a cosine similarity and a cosine similarity value is allocated to the at least one service case on a basis of the cosine similarity.

3. The bot as claimed in claim 1, wherein the bot generates at least one ticket from the at least one service case.

4. A communication platform, comprising a processor and memory, wherein a bot is stored in the memory, and when executed by the processor of the communication platform causes the bot to perform the steps of:

joins an active conference between at least two persons on the communication platform regarding at least one service case, the active conference being initiated by at least one person of the at least two persons on the communication platform to identify a problem with at least one of an installation and a component associated with the at least one service case, wherein the active conference is a live chat session between at least two persons;

converts the at least one service case into a numerical representation of the at least one service case using natural language processing and machine learning;

reads in an input data record comprising a plurality of tickets of past or already present service cases, wherein the bot has converted the plurality of tickets into a plurality of numerical representations of the tickets using natural language processing and machine learning;

listens in on the live chat session between at least two persons on the communication platform, wherein information is exchanged between the at least two persons during the live chat session and is associated with the at least one service case;

wherein the bot listens in on a further communication process between the at least two persons on the communication platform, wherein the further communication process has the at least one service case;

proactively identifies the problem and offers a solution to the problem to the at least two persons during the live chat session without being prompted by the at least two persons, wherein, as a function of proactively identifying the problem and offering the solution, the bot:

accesses a database to locate a similar case that is similar to the at least one service case, a similarity value being determined by performing a similarity calculation using a similarity function that compares the numerical representation of the at least one service case with the plurality of numerical representation stored in the database, wherein the bot generates the similar case by applying a linguistic algorithm to the further communication process if the similarity value undershoots a particular threshold value;

identifies the problem associated with the at least one service and offers the solution to the problem to the at least two persons during the live chat session on the communication platform based on a problem and solution of the similar case so that a response time to the at least one service case is shortened and a downtime experienced by the at least one of an installation and the component is at least reduced;

combines the input data record with a content of the live chat session which has been listened in on during the active conference between the at least two persons; and generates an output data record which is stored in the database, wherein the output data record has the input data record and the content of the live chat session.

5. A computer-implemented method for a communication platform comprising:

joining an active conference between at least two persons on the communication platform regarding at least one service case, the active conference being initiated by at least one person of the at least two persons on the communication platform to identify a problem with at least one of an installation and a component associated with the at least one service case, wherein the active conference is a live chat session between at least two persons;

converting the at least one service case into a numerical representation of the at least one service case using natural language processing and machine learning;

reading in an input data record by means of a bot, wherein the input data record comprises a plurality of tickets of past or already present service cases, wherein the bot has converted the plurality of tickets into a plurality of numerical representations of the tickets using natural language processing and machine learning;

listening in on the live chat session of the active conference between at least two persons on the communication platform by means of the bot, wherein information is exchanged between the at least two persons during the live chat session and is associated with the at least one service case;

wherein the bot listens in on a further communication process between the at least two persons on the communication platform, wherein the further communication process has the at least one service case;

proactively identifies the problem and offers a solution to the problem to the at least two persons during the live chat session without being prompted by the at least two persons, wherein, as a function of proactively identifying the problem and offering the solution, the bot:

accesses a database to locate a similar case that is similar to the at least one service case, a similarity value being determined by performing a similarity calculation using a similarity function that compares the numerical representation of the at least one service case with the plurality of numerical representation stored in the database; wherein the bot generates the similar case by applying a linguistic algorithm to the further communication process if the similarity value undershoots a particular threshold value;

identifies the problem associated with the at least one service and offers the solution to the problem to the at least two persons during the live chat session on the communication platform based on a problem and solution of the similar case so that a response time to the at least one service case is shortened and a downtime experienced by the at least one of an installation and the component is at least reduced;

combining the input data record with a content of the live chat session which has been listened in on during the active conference between the at least two persons; and generating an output data record which is stored in the database, wherein the output data record has the input data record and the content of the live chat session.

6. A non-transitory computer program product, comprising a computer readable hardware storage device having computer readable program code stored therein, said program code executable by a processor of a computer system to implement a method including:

joining an active conference between at least two persons on the communication platform regarding at least one service case, the active conference being initiated by at least one person of the at least two persons on the communication platform to identify a problem with at least one of an installation and a component associated with the at least one service case, wherein the active conference is a live chat session between at least two persons;

converting the at least one service case into a numerical representation of the at least one service case using natural language processing and machine learning;

reading in an input data record by means of a bot, wherein the input data record comprises a plurality of tickets of past or already present service cases, wherein the bot has converted the plurality of tickets into a plurality of numerical representations of the tickets using natural language processing and machine learning;

listening in on the live chat session of the active conference between at least two persons on the communication platform by means of the bot, wherein information is exchanged between the at least two persons during the live chat session and is associated with the at least one service case;

wherein the bot listens in on a further communication process between the at least two persons on the communication platform, wherein the further communication process has the at least one service case;

proactively identifying the problem and offering a solution to the problem to the at least two persons during the live chat session without being prompted by the at least two persons, wherein, as a function of proactively identifying the problem and offering the solution, the bot:

accesses a database to locate a similar case that is similar to the at least one service case, a similarity value being determined by performing a similarity calculation using a similarity function that compares the numerical representation of the at least one service case with the plurality of numerical representation stored in the database; wherein the bot generates the similar case by applying a linguistic algorithm to the further communication process if the similarity value undershoots a particular threshold value;

identifies the problem associated with the at least one service and offers the solution to the problem to the at least two persons during the live chat session on the communication platform based on a problem and solution of the similar case so that a response time to the at least one service case is shortened and a downtime experienced by the at least one of an installation and the component is at least reduced;

combining the input data record with a content of the live chat session which has been listened in on during the active conference between the at least two persons; and generating an output data record which is stored in the database, wherein the output data record has the input data record and the content of the live chat session.

* * * * *